United States Patent
Cho et al.

(10) Patent No.: US 9,507,891 B1
(45) Date of Patent: *Nov. 29, 2016

(54) AUTOMATING A MICROARCHITECTURE DESIGN EXPLORATION ENVIRONMENT

(71) Applicant: International Business Machines Corporation, Armonk, NY (US)

(72) Inventors: Minsik Cho, Austin, TX (US); Brian R. Konigsburg, Austin, TX (US); Indira Nair, Briarcliff Manor, NY (US); Haoxing Ren, Austin, TX (US); Jeonghee Shin, Millwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/725,122

(22) Filed: May 29, 2015

(51) Int. Cl.
G06F 17/50 (2006.01)

(52) U.S. Cl.
CPC ....... *G06F 17/5009* (2013.01); *G06F 17/5022* (2013.01)

(58) Field of Classification Search
CPC .................. G06F 17/5009; G06F 17/5022
See application file for complete search history.

(56) References Cited

U.S. PATENT DOCUMENTS

| | | | |
|---|---|---|---|
| 6,457,173 B1 | 9/2002 | Gupta et al. | |
| 6,477,683 B1 | 11/2002 | Killian | |
| 6,477,697 B1 | 11/2002 | Killian | |
| 6,523,110 B1 | 2/2003 | Bright | |
| 6,668,308 B2 | 12/2003 | Barroso | |
| 6,826,522 B1 | 11/2004 | Moller | |
| 7,036,106 B1 | 4/2006 | Wang | |
| 7,047,394 B1 | 5/2006 | Van Dyke et al. | |

(Continued)

FOREIGN PATENT DOCUMENTS

| DE | 1020008045767 | 11/2010 |
|---|---|---|
| EP | 2508978 | 10/2012 |
| WO | WO2013147868 | 3/2013 |

OTHER PUBLICATIONS

Deepak; "Metamodeling Driven IP Reuse for System-on-chip Integration and Microprocessor Design"; Dissertation; Nov. 2, 2007; Blacksburg, Virginia; pp. 1-252.*

(Continued)

*Primary Examiner* — Naum B Levin
(74) *Attorney, Agent, or Firm* — Harrington & Smith

(57) ABSTRACT

In a computing system running an environment for designing operation of circuity, at least the following are performed for providing simulations and evaluations of one or more user-defined modules of circuitry including one or more pipeline stages in a pipeline. A model of the pipeline is automatically generated by using a pipeline block diagram, where the model is generated in a high-level modeling language able to perform simulations of circuitry with the pipeline. An interface is automatically generated between the one or more user-defined modules and the generated model of the pipeline, the interface including a set of access methods to the pipeline. Evaluation is performed of the one or more user-defined modules using the automatically generated model of the pipeline and the automatically generated interface. Methods, apparatus, and computer program products are disclosed.

20 Claims, 8 Drawing Sheets

(56) References Cited

U.S. PATENT DOCUMENTS

| | | | |
|---|---|---|---|
| 7,058,562 B2 | 6/2006 | Powell | |
| 7,062,728 B2 | 6/2006 | Tojima | |
| 7,103,008 B2 * | 9/2006 | Greenblat | G06F 15/78 370/229 |
| 7,200,735 B2 | 4/2007 | Wang | |
| 7,260,798 B2 * | 8/2007 | Gupta | G01R 31/318314 716/104 |
| 7,360,180 B2 * | 4/2008 | Seno | G06F 17/505 703/16 |
| 7,404,172 B2 | 7/2008 | Wong | |
| 7,516,320 B2 | 4/2009 | Khan | |
| 7,529,764 B2 | 5/2009 | Gutsche | |
| 7,792,933 B2 * | 9/2010 | Butts | G06F 17/5022 709/222 |
| 8,024,697 B2 | 9/2011 | Hamilton | |
| 8,205,174 B2 | 6/2012 | Li | |
| 8,229,726 B1 | 7/2012 | Magdon-Ismail | |
| 8,286,112 B2 * | 10/2012 | Miranda | G06F 17/5031 716/110 |
| 8,327,029 B1 | 12/2012 | Purser | |
| 8,359,561 B2 | 1/2013 | Bormann | |
| 8,448,106 B1 | 5/2013 | Dimou | |
| 8,463,589 B2 | 6/2013 | Clark | |
| 9,250,900 B1 | 2/2016 | Kim | |
| 9,405,866 B1 | 8/2016 | Cho | |
| 2003/0069723 A1 | 4/2003 | Hegde | |
| 2004/0158802 A1 | 8/2004 | Wong | |
| 2005/0049843 A1 * | 3/2005 | Hewitt | G06F 17/5045 703/14 |
| 2006/0064574 A1 | 3/2006 | Rolfs | |
| 2007/0277130 A1 | 11/2007 | Lavelle | |
| 2011/0035204 A1 * | 2/2011 | Smirnov | G06F 17/505 703/14 |
| 2011/0307688 A1 | 12/2011 | Nurvitadhi et al. | |
| 2012/0185231 A1 | 7/2012 | Lo | |
| 2014/0101636 A1 | 4/2014 | Correll et al. | |
| 2015/0363517 A1 | 12/2015 | Clark | |

OTHER PUBLICATIONS

Shin, Jeonghee, John A. Darringer, Guojie Luo, Alan J. Weger, and Charles L. Johnson. "Early chip planning cockpit." In Design, Automation & Test in Europe Conference & Exhibition (DATE), 2011, pp. 1-4. IEEE, 2011.

Shen, Jian, and Jacob A. Abraham. "An RTL abstraction technique for processor microarchitecture validation and test generation." Journal of Electronic Testing 16, No. 1-2 (2000): 67-81.

* cited by examiner

```
# attribute size determined by pipe configuration
#                 name                type
ATTRIBUTE_INST    InstPrediction      bool
ATTRIBUTE_INST    InstTargetAddress   IFAR_t
ATTRIBUTE_INST    InstBTBCol          sc_unit<BTB_NUM_SETS>
ATTRIBUTE_INST    InstBTBColPredict   sc_unit<BTB_NUM_SETS>
ATTRIBUTE_INST    InstBHT             sc_unit<BTB_BHT_BITS>
```

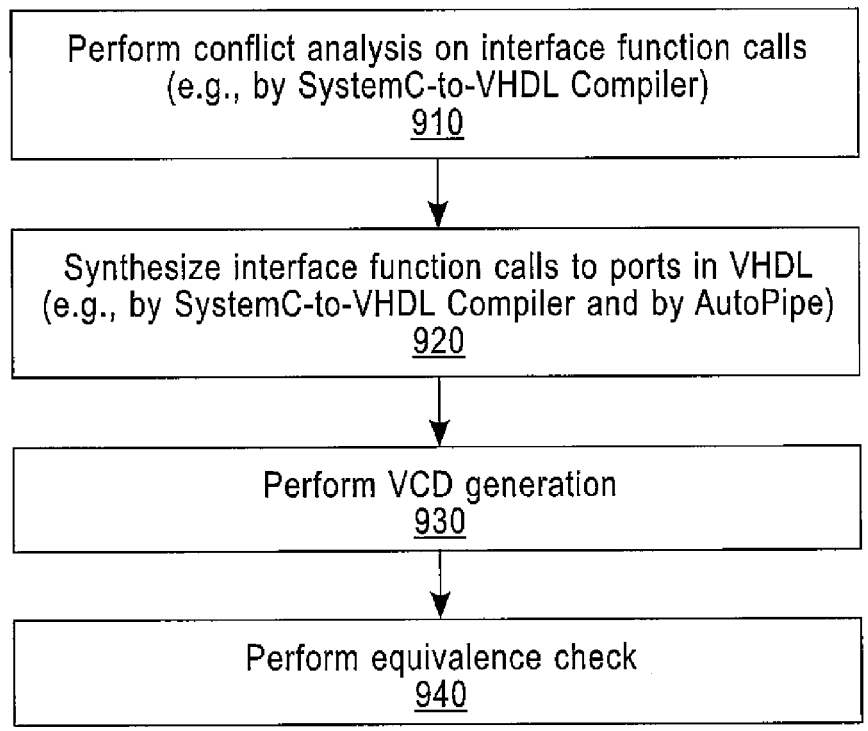

Perform conflict analysis on interface function calls
(e.g., by SystemC-to-VHDL Compiler)
910

Synthesize interface function calls to ports in VHDL
(e.g., by SystemC-to-VHDL Compiler and by AutoPipe)
920

Perform VCD generation
930

Perform equivalence check
940

FIG. 8

```
// initialization
bool _MisPredVal = false;
unsigned _seq = 0;
                                                          ← 1010 if (!pI->getValid(BR_EX_STAGE)) {                         ← 1020
  MisPredVal_s = _MisPredVal;
  MisPredSeq_s = _seq;
  continue;
}
...
```

```
PORT {                                                    ← 1030
  nclk: IN std_ulogic;
  p1_getValid_S4_ret0:    IN std_ulogic;
  p1_getValid_G3_ret0:    IN std_ulogic;
  p1_getValid_FXUOFIN_ret0: IN std_ulogic;
  p1_getValid_N4_ret0:    IN std_ulogic;
  p1_getInstructionValid_S4_idx_ret0: IN array32_0;
  p1_getInstructionValid_G3_idx_ret0: IN array32_0;
  p1_getInstructionValid_FXUOFIN_idx_ret0: IN array32_0;
  p1_getInstructionValid_N4_idx_ret0: IN array32_0;
  p1_getInstructionIsBranch_S4_idx_ret0: IN array32_0;
  p1_callInstructionIsBranch_G3_idx_ret0: IN array32_0;
  p1_getInstructionIsBranch_N4_idx_ret0: IN array32_0;
  p1_getInstructionTaken_S4_idx_ret0: IN array32_0;
  p1_getInstructionTaken_N4_idx_ret0: IN array32_0;
  p1_getInstPrediction_S4_idx_ret0: IN array32_0;
  p1_getInstPrediction_N4_idx_ret0: IN array32_0;
  p1_getInstructionSeq_S4_idx_ret0: IN array32_1;
  p1_getInstructionNext_address_S4_idx_ret0: IN array32_2;
  p1_callInstructionsExecute_S4_idx_ret0: IN array32_2;
  p1_getInstructionAddress_S4_idx_ret0: IN array32_2;
  p1_getInstructionVirtualOperandAddr_S4_idx_ret0: IN array32_4;
  p1_callInstructionIsMcentry_S4_idx_ret0: IN array32_0;
  p1_getIsJump_S4_idx_ret0: IN array32_0;
  p1_getInstructionSpec_FXUOFIN_idx_ret0: IN array32_0;
  p1_callInstructionIsConditionalBranch_N4_idx_ret0: IN array32_0;
  Ifar@Address_o: OUT std_ulogic_vector ( G3 downto 0 );
  nextSeqAddr_o: OUT std_ulogic;
  jump_o: OUT std_ulogic;
  p1_setInstructionHold_G3)idx_arg3: OUT array32_0;
  p1_setHold_FXUOFIN_idx_CMPL_arg4: OUT array32_0;
  p1_flush_arg1: OUT std_ulogic_vector ( 31 downto 0 )
};
```

FIG. 9

AUTOMATING A MICROARCHITECTURE DESIGN EXPLORATION ENVIRONMENT

BACKGROUND

This invention relates generally to design of integrated circuits such as processors and, more specifically, relates to environments in which such design is carried out.

Much process of modern micro architecture design for integrated circuits such as processors has been—to a large degree—automated. Individual or teams of designers develop modules that perform sets of functions. Each module forms one part of the design. These modules are implemented according to the specification of logic, simulated for functional correctness and performance evaluation, and finally synthesized into integrated circuits in a design environment. Modules may also be called macros or blocks.

The modules can be implemented in a hardware description language such as VHDL, Verilog, System Verilog, SystemC, etc. For instance, in SystemC, a module can be mapped to one or multiple of container classes of functionality with state, behavior, and structure for hierarchical connectivity, called sc_module. Modules may be abstract so as to capture partial logic or miss out low-level details, and thus not ready for synthesis yet. Or, they may be detailed and thus synthesizable. Here, synthesis is a process to convert design description eventually to a "netlist" or other information that is used to manufacture an integrated circuit.

Typically, a design starts at a high level, where various functions are split across several modules. Ideally, each module is as independently designed and evaluated as possible, in order to parallelize design efforts. However, traditional design environments do not support such parallelized design productivity, thereby reducing the ability for the designers to evaluate their modules without other modules. This is particularly true for complex, pipelined logic, such as processor designs, where individual modules affect different parts of the pipeline. For instance, a branch prediction module may affect and interact with multiple parts of the pipeline such as instruction fetch and branch execution modules. Even if each module is designed independently, the overall design may not be fully simulated or synthesized until late in the process, when all the other modules interacting with it are completed. Not only does this limitation prolong development time but it also prevents the designers from improving their design in the meantime.

BRIEF SUMMARY

The following summary is merely intended to be exemplary. The summary is not intended to limit the scope of the claims.

An exemplary embodiment is a method, comprising: in a computing system running an environment for designing operation of circuitry, performing at least the following for providing simulations and evaluations of one or more user-defined modules of circuitry comprising one or more pipeline stages in a pipeline: automatically generating a model of the pipeline by using a pipeline block diagram, where the model is generated in a high-level modeling language able to perform simulations of circuitry with the pipeline; automatically generating an interface between the one or more user-defined modules and the generated model of the pipeline, the interface comprising a set of access methods to the pipeline; and performing evaluation of the one or more user-defined modules using the automatically generated model of the pipeline and the automatically generated interface.

An additional example of an embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary embodiment is a computing system, comprising: one or more memories comprising computer-readable code; and one or more processors, which in response to execution of the computer readable code cause the computing system to perform the following: running an environment for designing operation of circuitry, wherein running the environment comprises performing at least the following for providing simulations and evaluations of one or more user-defined modules of circuitry comprising one or more pipeline stages in a pipeline: automatically generating a model of the pipeline by using a pipeline block diagram, where the model is generated in a high-level modeling language able to perform simulations of circuitry with the pipeline; automatically generating an interface between the one or more user-defined modules and the generated model of the pipeline, the interface comprising a set of access methods to the pipeline; and performing evaluation of the one or more user-defined modules using the automatically generated model of the pipeline and the automatically generated interface.

A further example is a computer program product comprising a computer readable storage medium comprising computer-readable code, the computer-readable code causing a computing system, in response to executing the computer-readable cod, to perform the following: running an environment for designing operation of circuity, the running the environment comprising performing at least the following for providing simulations and evaluations of one or more user-defined modules of circuitry comprising one or more pipeline stages in a pipeline: automatically generating a model of the pipeline by using a pipeline block diagram, where the model is generated in a high-level modeling language able to perform simulations of circuitry with the pipeline; automatically generating an interface between the one or more user-defined modules and the generated model of the pipeline, the interface comprising a set of access methods to the pipeline; and performing evaluation of the one or more user-defined modules using the automatically generated model of the pipeline and the automatically generated interface.

An additional exemplary embodiment is an apparatus comprising: means for running an environment for designing operation of circuity, wherein the means for running the environment comprises means for performing at least the following for providing simulations and evaluations of one or more user-defined modules of circuitry comprising one or more pipeline stages in a pipeline, the means for performing comprising: means for automatically generating a model of the pipeline by using a pipeline block diagram, where the model is generated in a high-level modeling language able to perform simulations of circuitry with the pipeline; means for automatically generating an interface between the one or more user-defined modules and the generated model of the pipeline, the interface comprising a set of access methods to the pipeline; and means for performing evaluation of the one or more user-defined modules using the automatically generated model of the pipeline and the automatically generated interface.

BRIEF DESCRIPTION OF THE SEVERAL VIEWS OF THE DRAWINGS

FIG. 7 is an example of a specification of per-instruction variables in a configuration file;

FIG. 8 is a logic flow diagram for synthesizing the interface to the pipeline, and illustrates the operation of an exemplary method, a result of execution of computer program instructions embodied on a computer readable memory, functions performed by logic implemented in hardware, and/or interconnected means for performing functions in accordance with an exemplary embodiment; and FIG. 9 shows an example of an interface function call synthesized to a port in accordance with an exemplary embodiment.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Figure 1:
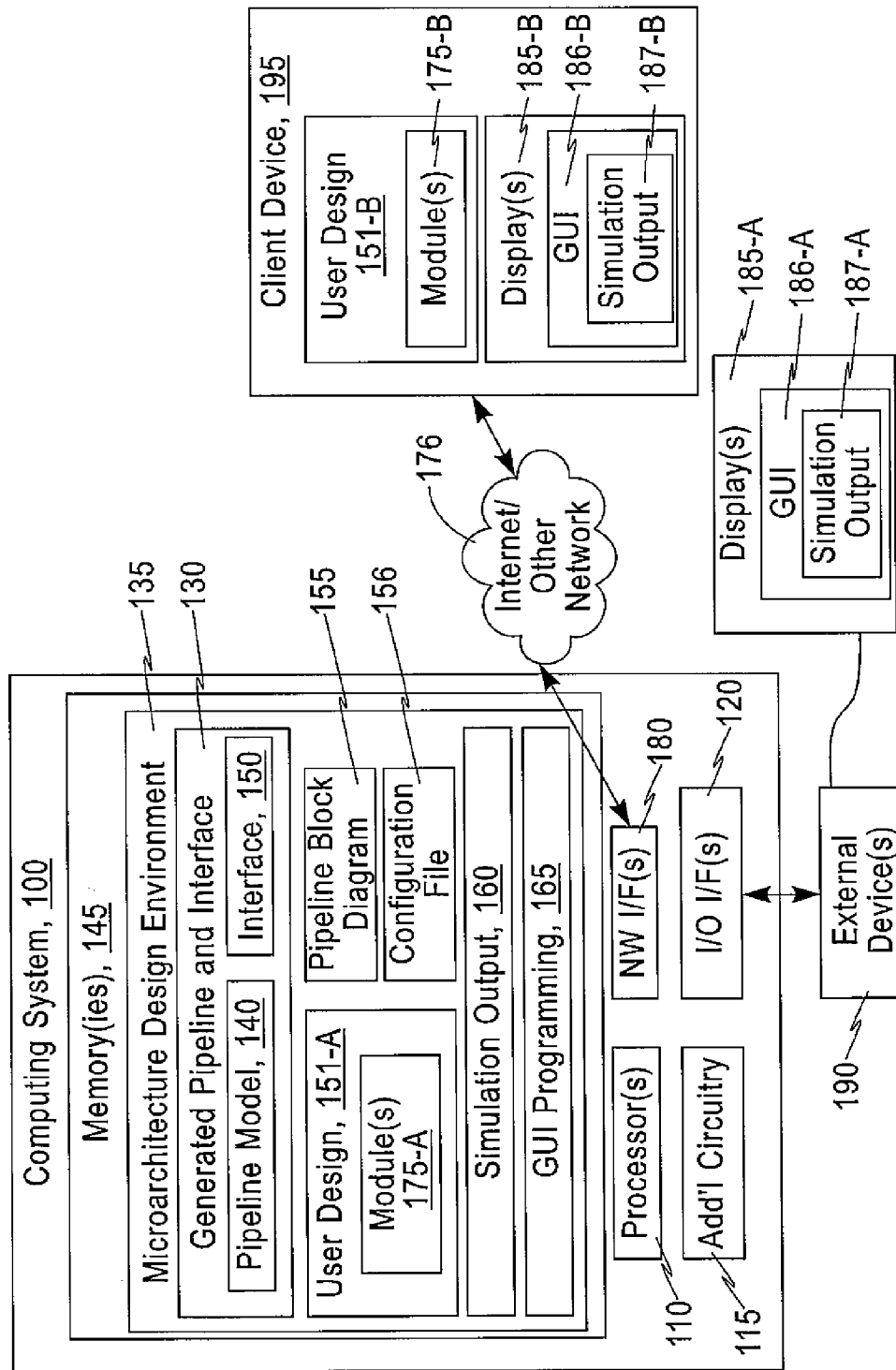
FIG. 1 is a block diagram of an example of a system suitable for performing the exemplary embodiments herein.

An introduction to techniques for automating a microarchitecture design planning environment is provided now in conjunction with FIG. 1. Turning to FIG. 1, a block diagram is shown of an example of a system suitable for performing the exemplary embodiments herein. A computing system 100 comprises one or more memories 145, one or more processors 110, additionally circuitry 115, one or more network interfaces (N/W I/F(s)) 180, and one or more input/output interfaces (I/O IF(s)) 120. The computing system 100 may also be connected to external devices 190, which may allow a designer to access the computing system 100 via a mouse, touchscreen, display screen, or other output or input (as external devices). The memories 145 may comprise non-volatile and/or volatile RAM (random access memory), cache memory, NAND-based flash memory, long term storage (e.g., hard drive), and/or read only memory. The computing system 100 may also be a server and may be accessed remotely, e.g., through the Internet 176 or other network. A designer (not shown) connects to the Internet/other network 176 using a client device 195. The client device is described in more detail below.

The one or more memories 145 of the computing system 100 comprise a microarchitecture design environment 135, which itself comprises a generated pipeline and interface 130 (including a pipeline model 140 and an interface model 150), a user design 151-A (including one or more modules 175-a), a pipeline block diagram 155, a configuration file 156, simulation output 160, and GUI programming 165. Note that FIG. 1 is only an overview, and other elements that may be included in the microarchitecture design environment 135 that are not described in FIG. 1.

In one example, a designer (not shown) interacts with the computing system 100 using the external device(s) 190, such as a mouse and keyboard, and the display(s) 185-A. The display(s) 185-A show a GUI 186-A that is used to display simulation output 187-A. The simulation output 187-A is some subset of the simulation output 160 produced by the microarchitecture design environment 135. For instance, the simulation output 187-A could relate to only a single module 175, while the simulation output 160 relates to the many elements of an entire design. The GUI 186-A is created by the microarchitecture design environment 135 using the GUI programming 165.

In another example, a designer (not shown) interacts with the computing system 100 using the client device 195 and the corresponding display(s) 185-B. The display(s) 185-B show a GUI 186-B that is used to display simulation output 187-B. The simulation output 187-B is some subset of the simulation output 160 produced by the microarchitecture design environment 135. The GUI 186-A is created by the microarchitecture design environment 135 using the GUI programming 165. In this example, the user design 151-B and module(s) 175-B could be loaded into the microarchitecture design environment 135, as the user design 151-A and module(s) 175-A. Changes made to the user design 175 could be made to the user design 175-A or 175-B and propagated to the other user design. In another example, the user design 151-A and module(s) 175-A are kept on the computing system 100 and the designer makes changes there and "uploads" those changes to the computing system 100.

The microarchitecture design environment 135 may be implemented as computer-readable program code that is executable by the one or more processors 110 to cause the computing system 100 to perform one or more of the operations described herein. The processors 110 may be any processing units, such as digital signal processors and/or single-core or multi-core general purpose processors. In another example, the operations may also be performed, in part or completely, by the additional circuitry 115 that implements logic to carry out the operations. The additional circuitry 115 may be implemented as part of the one or more processors 110 or may be separate from the one or more processors 110. The processors 110 may be any processing units, such as digital signal processors and/or single-core or multi-core general purpose processors. The additional circuitry 115 may be any electronic circuit such as an application specific integrated circuit or programmable logic.

Additional exemplary details of FIG. 1 are further described below.

Figure 2:
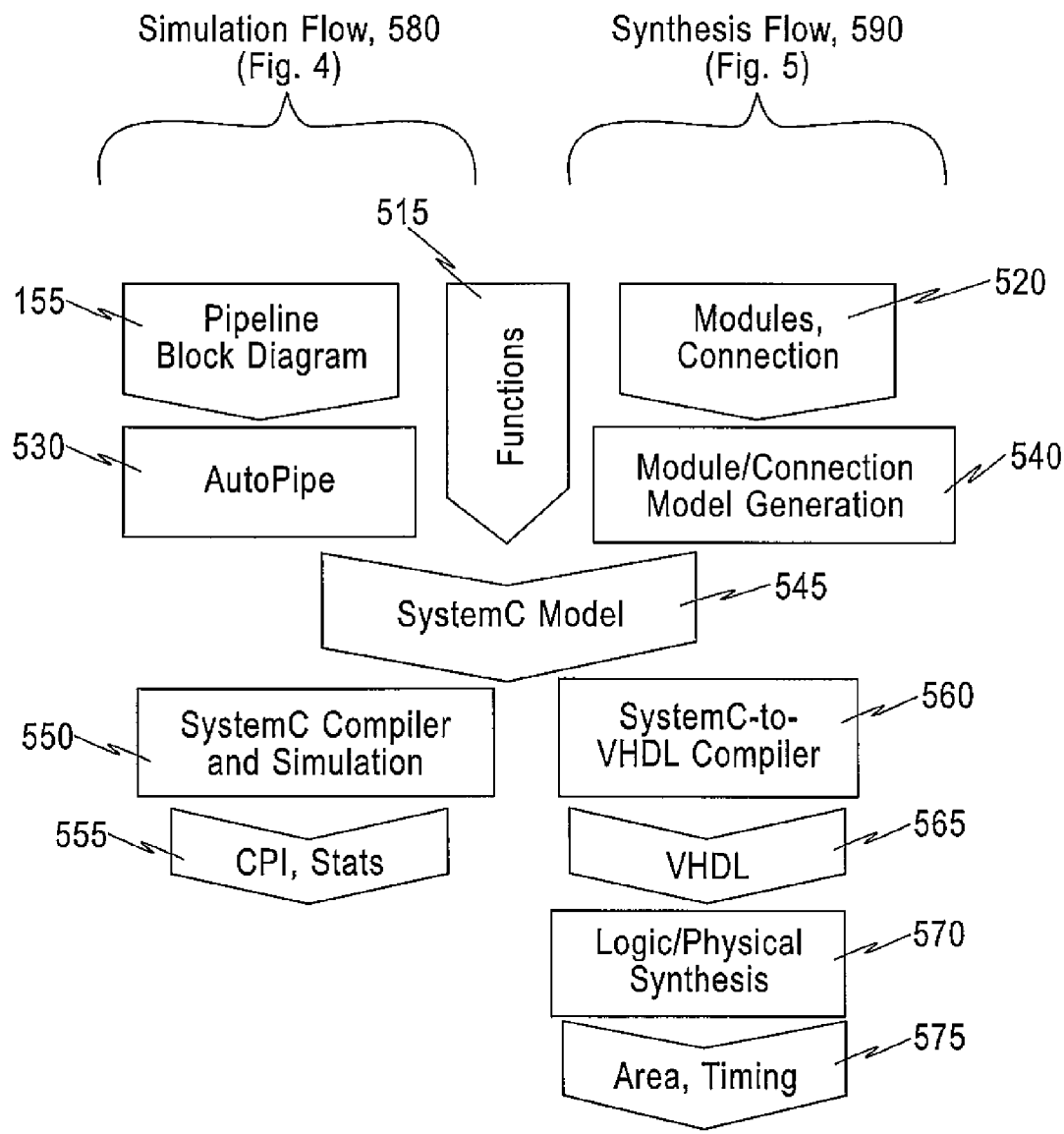
FIG. 2 is a block diagram illustration of the microarchitecture design environment, including possible inputs and outputs thereof, in accordance with an exemplary embodiment.
Figure 3:
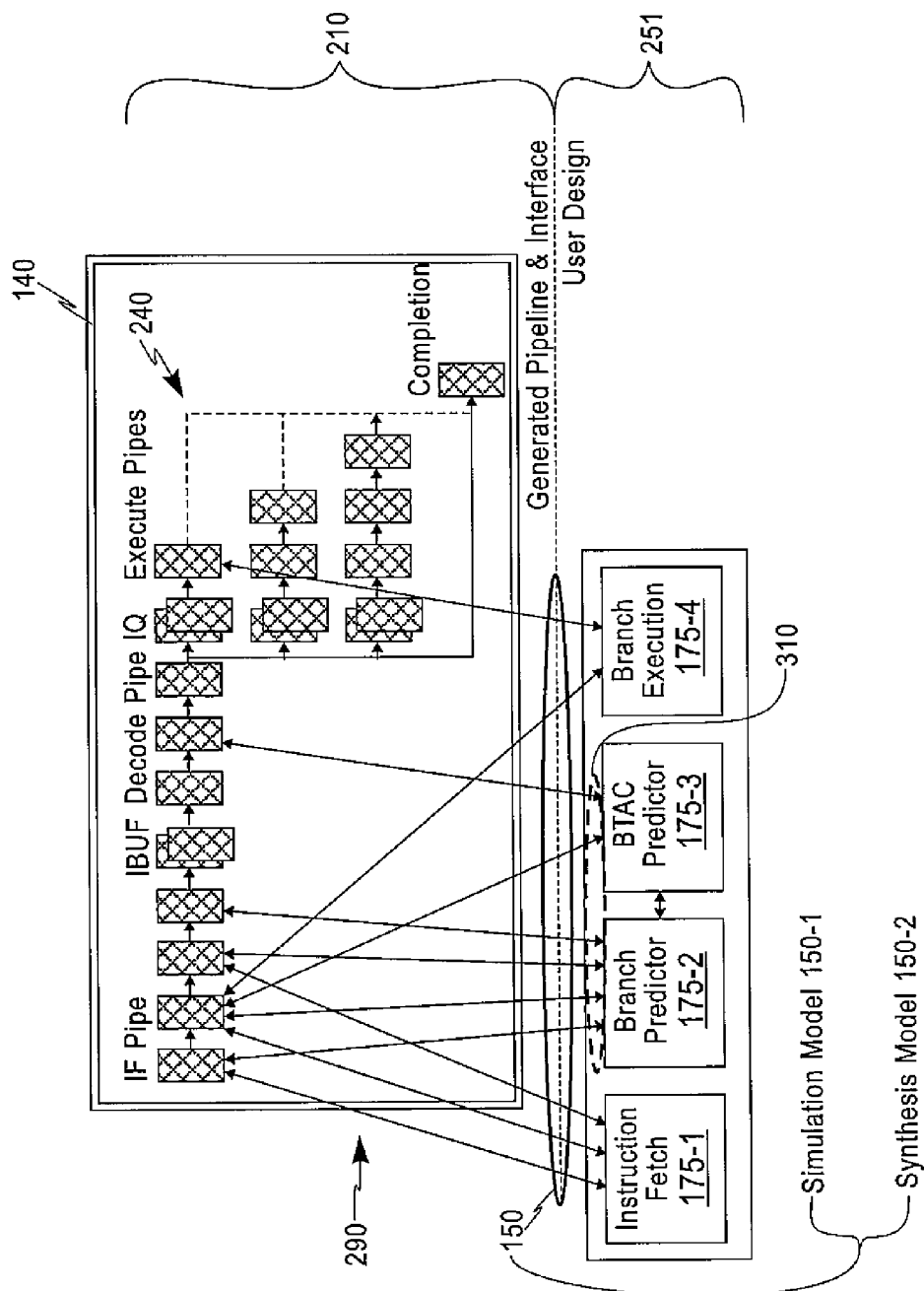
FIG. 3 illustrates a structure of a pipeline and modules used for design of an integrated circuit, in accordance with an exemplary embodiment herein.

FIGS. 2 and 3 will be discussed together to provide an overview of exemplary embodiments. FIG. 2 is a block diagram illustration and flow 500 of the microarchitecture design environment 135, including possible inputs and outputs thereof, in accordance with an exemplary embodiment. FIG. 3 illustrates one example of a structure of a pipeline and modules used for design of an integrated circuit.

In the example of FIG. 3, a microarchitecture design environment auto-generates pipeline and interface 210, which includes the pipeline 240 and the interface 150, and a user design 251. The pipeline 240 includes multiple "pipe stages" such as IF (instruction fetch), IBUF (instruction buffer), decode, IQ (instruction queue), execution, and completion stages. Each pipe stage may include stage information, validity of the stage, next state information, and instructions residing at the stage. An instruction may include validity, instruction address, opcode (operation code, which is the portion of a machine language instruction that specifies the operation to be performed), branch/prediction information, and etc.

The user design 251 includes four modules 175: instruction fetch 175-1; branch predictor 175-2; BTAC predictor 175-3; and branch execution 175-4. The instruction fetch 175-1 and branch execution 175-4 modules are assumed to be abstract modules that are not ready for synthesis, while the branch predictor 175-2 and BTAC predictor 175-3 modules are assumed to be detailed models ready for synthesis. The abstract models are assumed to be high level abstractions of circuitry which allows simulation, and the detailed modules can be synthesized to gate level, which allows the estimation of timing, area, power, and the like, as well as simulation. As abstract models 175 evolve to detailed models, pipeline access via the interface, which is a channel allowing modules to interact with each other indirectly, is replaced (as illustrated by reference 310) with "real" ports (such as SystemC or VHDL ports), which allow modules to interact with each other directly. Eventually, when all modules are completed, any pipeline access by the modules is replaced with "real" ports directly connecting to other modules, and the generated pipeline 240 is no longer used, and thus discarded. The connections 290 indicate how one module affects the stages of the pipeline 240.

The interface 150 comprises a set of access methods used by the modules 175 to access the channel 140. The interface 150 may be, e.g., generated as a SystemC "interface" class. Each connection 290 typically corresponds to one access method. Specifically, the interface 150 may include get/set functions to access instructions and PipeStage states, where a Pip eStage is a stage of the pipeline 240. A get function reads data from the pipeline and a set function writes data to the pipeline. When the modules 175 are synthesized, the interface access by the modules 175 becomes ports in VHDL.

As stated above, traditional design environments do not support parallelized design productivity, thereby reducing the ability for the designers to evaluate their modules without other modules. In particular, in a traditional design environment, it is generally not possible for a single module 175, typically one of several or many such modules, to be simulated, and for multiple design alternatives of the single module to be explored. In a traditional design environment, all of the modules 175 need to be available in order to provide a complete simulation and synthesis of the overall user design. It is generally not possible in the traditional design environment to perform design exploration for a single module 175 within the context of an overall user design.

The instant invention allows such design exploration. As such, the instant invention should improve productivity for single modules and also for a complete design. For instance, it is possible in an exemplary embodiment to perform design exploration using only the branch predictor module 175-2 (as an example) by itself, without the other modules 175-1, 175-3, and 175-4. Thus, in the exemplary embodiments, it is not necessary for all modules 175 to be available to perform design exploration of one or more of the modules 175. It is expected, however, that the other modules would be added in time, until such point the user design 151 is finalized (e.g., and the pipeline 240 is "integrated" completely into the user design 151). Furthermore, exemplary embodiments herein allow both simulation (e.g., used to verify logical operation of module(s) is correct and to determine performance metrics) and synthesis (e.g., used to determine one or both of quality of hardware metrics or performance metrics).

There are a number of exemplary reasons for the construction of FIG. 3, which uses a channel 140 and interface 150, to be used. One reason is that channel implementation is hidden from communicating modules 175. Thus, a change on implementation of the channel 140 does not affect the modules 175. Additionally, the interface 150 can control accessibility to the channel 140. Further, one can define, in an example, the interface 150 with allowed methods only, e.g., read_if, write_if, which are read/get and write/set methods, respectively. Thus, the construction of FIG. 3 aids in design exploration of single or multiple modules 175.

In FIG. 2, blocks 530, 540, 550, 560, and 570 are blocks that perform functions and may be considered to be means for performing the functions. The blocks 155, 515, 520, 545, 555, 565, and 575 are possible inputs or outputs. The blocks on the left side of FIG. 2 are considered to be a simulation flow 580, which is illustrated in additional detail in FIG. 4. The blocks on the right side of FIG. 2 are considered to be a synthesis flow 590, which is illustrated in more detail in reference to FIG. 5.

A system architect creates the pipeline block diagram 155, which AutoPipe 530 automatically converts to a portion (e.g., the pipeline module 140 and the interface 150) of the SystemC model 545. AutoPipe is the name given to a block that automatically creates the pipeline module 140 and the interface 150.

Functions 515 are processes (e.g., cthread or method in SystemC) composing Modules. The Module/connection model generation block 540 uses the modules, connection data 520 and auto-generates module classes with ports, signals, and port connections for the modules 175. The SystemC model 545 therefore includes implementation of the pipeline model 140, the interface 150, and the modules 175 (e.g., and any connections between modules). In this example, a pipeline module 140 is automatically generated to assist in design space exploration. That is, the pipeline 240 is automatically generated in, as an example, SystemC to assist design space exploration. As is known, SystemC is a set of C++ classes and library which provide hardware description constructs and event-driven simulation. This allows a designer to simulate concurrent processes, each described using C++ syntax. SystemC processes can communicate in a simulated environment, using signals of all the datatypes offered by C++, some additional ones offered by the SystemC library, as well as user defined signals. In certain respects, SystemC deliberately mimics the hardware description languages VHDL and Verilog, but is more aptly described as a system-level modeling language. In this disclosure, SystemC is one example of a high-level modeling language able to describe logic in modules, implement a pipeline and its interface. In an exemplary embodiment, the pipeline 240 is modeled as a pipeline model 140, which for the example of SystemC is a channel in SystemC. The pipeline model 140 will also be referred to as channel 140, although it should be noted this is for the example of SystemC and use of other high-level modeling languages may use other programming constructs. A channel in SystemC is container class for data communication and synchronization. A module 175 is a container class of functionality with state, behavior, and structure for hierarchical connectivity.

It is noted that, in an exemplary embodiment, the AutoPipe block 530 generates two versions of the interface model 150, a simulation model 151-1 that is used in simulation flow 580 and a synthesis model 151-2 that is used in the synthesis flow 590. The correct interface model 150-1 or 150-2 is selected based on the flow 580 or 590.

As one set of possibilities for design evaluation via the simulation path 580, the system microarchitecture design environment 135 can operate on the SystemC model 545 by using the SystemC compiler and simulation block 550, which compiles the SystemC model 545 (as code) (such as with gcc, a C/C++ compiler) and performs high-level simulation with the binary generated by the compilation process. Block 550 may determine CPI and stats (statistics) 555. This set of possibilities for design simulation provides high-level simulation capabilities and performance evaluation.

As another set of possibilities for design evaluation via the synthesis path 590, the system microarchitecture design environment 135 can operate on the SystemC model 545 by using the SystemC-to-VHDL compiler 560 to create RTL (e.g., VHDL or Verilog) output 565, and from the VHDL output 565, use the logic/physical synthesis block 570 to determine area and timing information 575. Note that area and timing information are merely exemplary and other information, such as power usage may be included. These types of metrics are generally referred to as quality of hardware metrics. Other metrics may also be used, such as performance metrics like CPI. The VHDL output 565 is for the modules and the interface 150 but not the pipeline channel 140 which is used in the simulation flow. This second set of possibilities of design evaluation provides low-level simulation and also synthesis to a lower level of hardware description or netlist.

With this system, designers can perform design space exploration in parallel with other designers. For instance, designers can create various design alternatives for their modules 175 and evaluate them for "what-if" analysis. This system creates an environment that supports a mix of abstract and detailed models, which is essential for design space exploration. The abstract models allow quick modeling. Meanwhile, the detailed models allow for early area/timing/power estimation, as they can be synthesized to RTL/PD. These models communicate through the pipeline 240 and the interface 150 as needed.

Figure 4:
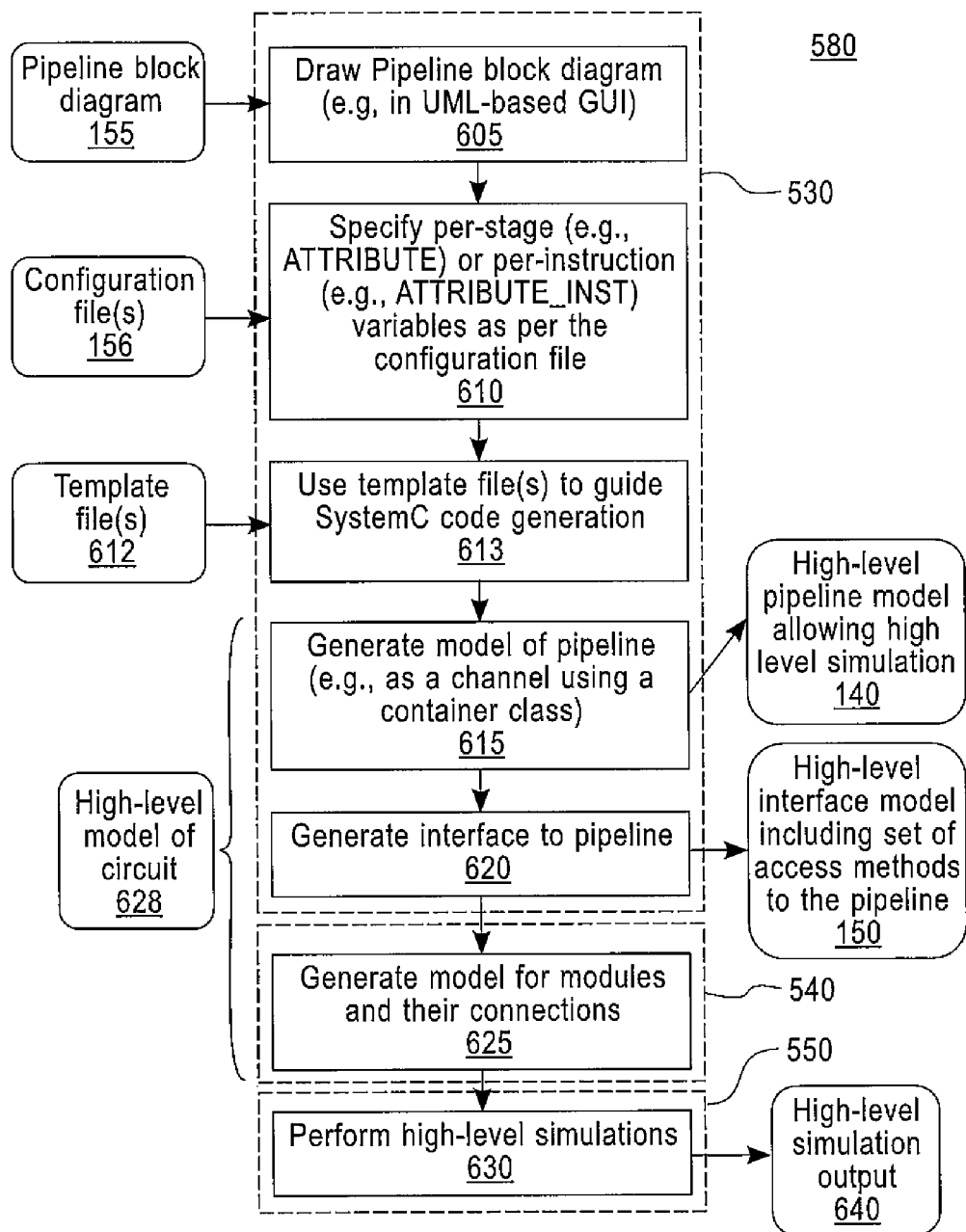
FIG. 4 is a logic flow diagram for automating a microarchitecture design exploration environment with respect to a simulation flow, and illustrates the operation of an exemplary method, a result of execution of computer program instructions embodied on a computer readable memory, functions performed by logic implemented in hardware, and/or interconnected means for performing functions in accordance with an exemplary embodiment.

Referring to FIG. 4, this figure a logic flow diagram for automating a micro architecture design exploration environment with respect to a simulation flow. This figure additionally illustrates the operation of an exemplary method, a result of execution of computer program instructions embodied on a computer readable memory, functions performed by logic implemented in hardware, and/or interconnected means for performing functions in accordance with an exemplary embodiment. The blocks of FIG. 4 are assumed to be performed by the computing system 100, e.g., under control at least in part by the microarchitecture design environment 135. For clarity, the blocks in FIG. 2 will also be referenced in the description of FIG. 4. It should be noted that the microarchitecture design environment 135 operates on a circuit design (e.g., user design 251). At some point, when the design is finished, the output of the microarchitecture design environment 135 enables the circuit design (that is, circuitry) to be fabricated. In the examples herein, that circuitry implements at least the pipeline 240. That is, the user design (e.g., modules) is the one which becomes real hardware at the end. The generated pipeline is a "design space exploration enabler" or "place holder" until everything comes together for the design. The generated pipeline has some but limited information of hardware but the generated pipeline does not have any functions of logic which compose the "real" pipeline.

Figure 6:
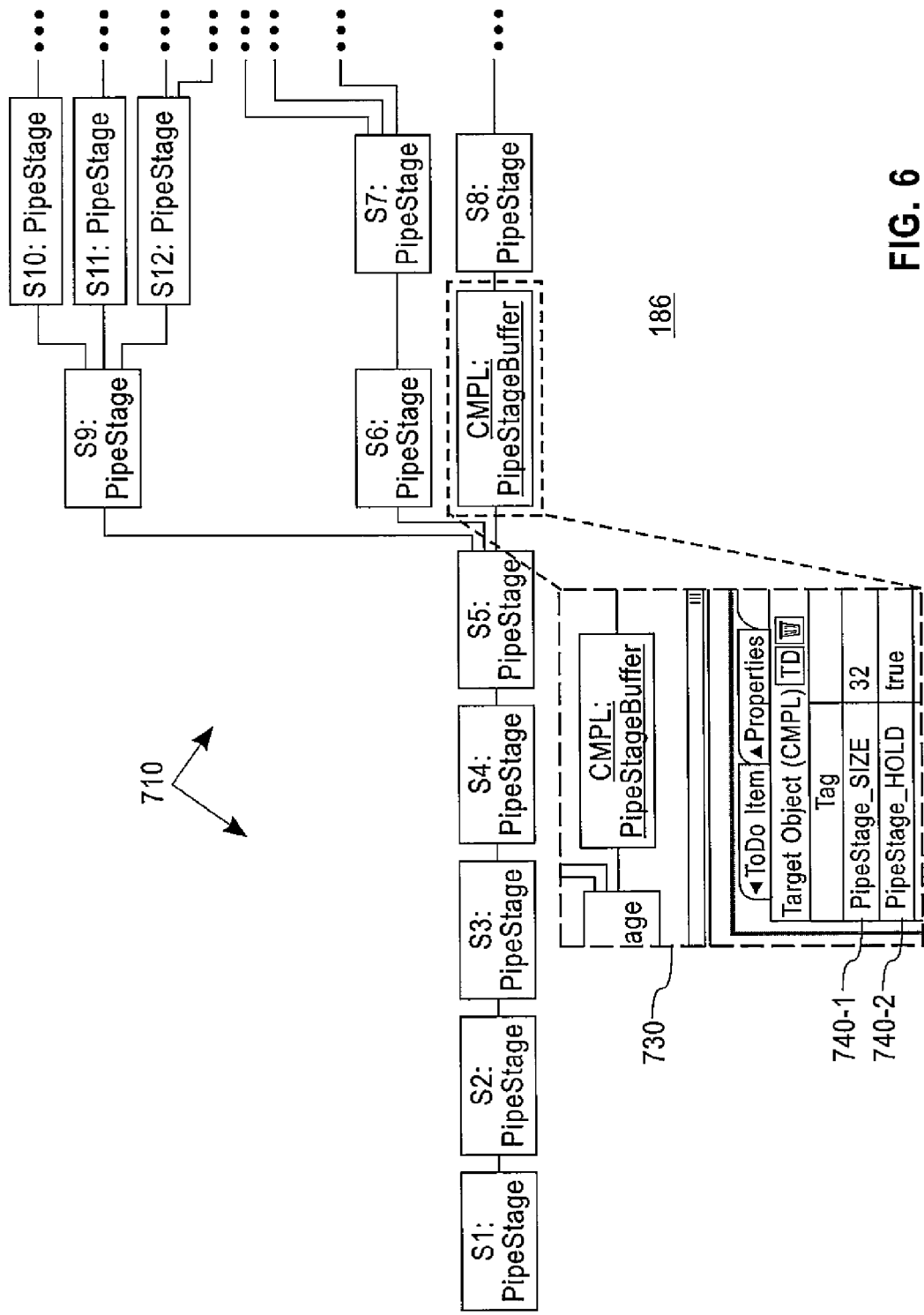
FIG. 6 is an example of a drawn pipeline block diagram in a GUI, in accordance with an exemplary embodiment.

In terms of FIG. 2, the AutoPipe block 530 performs blocks 605, 610, 613, 615, and 620 of FIG. 4. In block 605, the microarchitecture design environment 135 uses the pipeline block diagram 155 drawn by the designers, e.g., in a UML-based GUI (e.g., as part of GUI programming 165). An example of such a drawn pipeline block diagram is illustrated in FIG. 6. In block 610, the micro architecture design environment 135 specifies per-stage (e.g., ATTRIBUTE) or per-instruction (e.g., ATTRIBUTE_INST) variables as per the configuration file 156. The configuration file 156 may be created by the chip architect and/or the designer(s). An example using ATTRIBUTE_INST is shown in FIG. 7. Block 610 may include specifying per-stage and/or per-instruction variables. These allow designers to configure PipeStage and Instruction related states. These values move along with Instructions in the channel 140, and may be read or updated via the pipeline interface model 150 during simulation.

Template files 613 may also be used. For instance, these may be used to guide (block 613) SystemC code generation with AutoPipe commands. Such AutoPipe commands may include the following: PipeStage name (e.g., enum, char*), size (e.g., constant for loop unrolling), instruction member variables/methods, per-stage/instruction variables, ctor (constructor), include files, VCD code, and the like. There may be separate code generation from complex pipeline functions. The template files may include control/update functions to move PipeStage states, Instructions, and their states to next stages over simulation cycles as specified in the input pipeline block diagram, such as advance, flush, stall, hold, and invalidate.

In block 615, the microarchitecture design environment 135 automatically generates a model of the pipeline 240 (e.g., as a channel using a container class). The output is a high-level pipeline model 140 allowing high level simulation. In block 620, the microarchitecture design environment 135 generates the interface 150 to the pipeline 240. That is, the high-level interface model 150 is generated, including a set of access methods to the pipeline 240.

In terms of blocks 605, 610, 613, 615, and 620, pipeline block diagrams may include pipe stages, their connection and attributes such as PipeStage type, number of instructions, policy, and the like. They can be graphically drawn in a UML-based GUI, and captured in a text file such as XMI or XML Graph analysis may be used to configure pipe stages and connectivity. For instance, the graph analysis may determine a previous stage relative to a current stage, next stages relative to a current stage, a beginning stage, and an ending stage. The pipeline block diagrams can be used in speeding up the simulation time of auto-generated pipeline by pre-computing a number of next stages to advance instructions, for every instruction type, and pre-computing each stage's pipe ID to access an instruction table and a stage state table. The instruction table stores all instructions in a sorted manner. In an exemplary embodiment, instructions are stored in the table based on their corresponding sequence numbers so that one does not have to read all table entries to find where a certain instruction is.

In terms of the pipeline model 140, e.g., as a channel, pipeline channel instructions and states may be kept in tables. The instructions may be ordered by sequence number for fast pipeline flush. A PipeStage may hold a set of pointers to the instructions centrally stored in the tables. The data structure of tables minimizes copying of instructions from certain stages to their next, which provides for fast simulation. Data copy is needed only if instructions go to more than one stage, i.e., multiple next stages. During pipeline generation, a pre-computed clone bit may indicate if the pipe branches out. During simulations (see block 630), the pointers to instructions in the table may be updated every cycle. The update may be according to type (e.g., buffer or queue) and policy (e.g., hold, stall, invalid).

Regarding the pipeline interface and the corresponding interface module 150, get/set functions may be used for instruction variables/methods, per-stage/instruction variables. These would be implemented in the pipeline channel, e.g., as described by the pipeline model 140. User-defined functions may also be used. These may include function name, parameters, return type, and synthesis options specified in, e.g., an AutoPipe configuration file.

As described above, there could be two versions of the interface module 150: one for simulation (simulation model 150-1) and the other for synthesis (synthesis model 150-2). The simulation version 150-1) returns and/or updates PipeStage and instruction variables, and updates VCD accordingly. The synthesis version (synthesis model 150-2) has non-virtual functions, and passes synthesis options to the SystemC-to-VHDL compiler (see 560 in FIG. 2) in order to create VHDL ports for interface access.

In block 625, the microarchitecture design environment 135 generates a model for modules and their connections. In terms of FIG. 2, the module/connection model generation block 540 performs block 625. Blocks 615, 620, and 625 are assumed to output a high-level model 628 of the circuitry (e.g., the pipeline 240 and modules 175) to be simulated. The high-level model 628 is SystemC model 545 in the example of FIG. 2 and SystemC.

In block 630, the microarchitecture design environment 135 performs high-level simulations of the circuitry using the high-level model 628. The output produced is high-level simulation output 640. In the example of FIG. 2, the SystemC compiler and simulation block 540 performs block 630 and the output 640 includes the CPI and stats information in block 555.

Typically, a designer would cause the microarchitecture design environment 135 to perform some of these operations multiple times. A designer, for instance, would cause the microarchitecture design environment 135 to perform block 630, determine that circuitry in a module 175 should change (e.g., by using the high-level simulation output 640), change the circuitry by changing the module 175, and then cause the microarchitecture design environment 135 to perform blocks 625 and 630 (and block 620 if necessary). This process would be repeated typically many times during design exploration.

Figure 5:
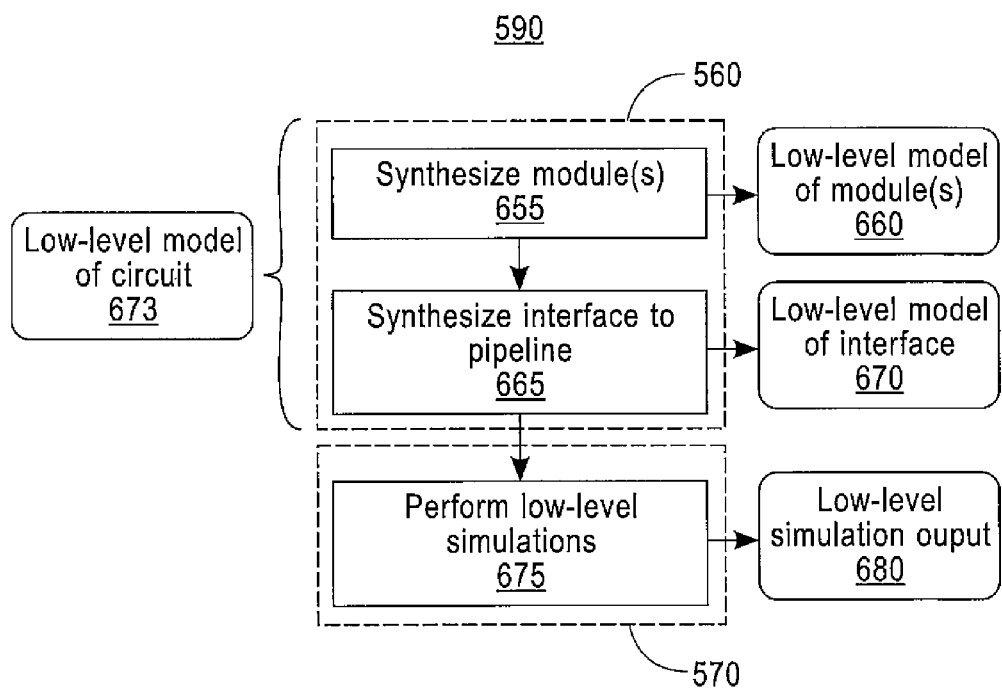
FIG. 5 is a logic flow diagram for automating a microarchitecture design exploration environment with respect to a synthesis flow, and illustrates the operation of an exemplary method, a result of execution of computer program instructions embodied on a computer readable memory, functions performed by logic implemented in hardware, and/or interconnected means for performing functions in accordance with an exemplary embodiment.

The microarchitecture design environment 135 may determine that one or more of the modules 175 should be synthesized. Typically, the designer would cause the microarchitecture design environment 135 to synthesize the module(s) 175. In response to a command from the designer, the microarchitecture design environment 135 performs synthesis, e.g., by performing the synthesis flow 590. Turning to FIG. 5, this figure is a logic flow diagram for automating a microarchitecture design exploration environment with respect to a synthesis flow 590. This figure further illustrates the operation of an exemplary method, a result of execution of computer program instructions embodied on a computer readable memory, functions performed by logic implemented in hardware, and/or interconnected means for performing functions in accordance with an exemplary embodiment. The blocks of FIG. 5 are assumed to be performed by the computing system 100, e.g., under control at least in part by the microarchitecture design environment 135. For clarity, the blocks in FIG. 2 will also be referenced in the description of FIG. 5.

In block 655 synthesizes the modules (and their connections) and determines low-level model 660 of the modules. The low-level model 660 is a description of the circuitry for the modules 175 (and their connections). In block 665, the microarchitecture design environment 135 also synthesizes the interface model 150 to determine a low-level model 670 of the interface model 150. The low-level model 670 is description of the circuitry for the interface model 150. Blocks 655 and 665 result in the low-level model 673 of the circuitry. In terms of FIG. 2, blocks 655 and 665 are performed by the SystemC-to-VHDL compiler 560 and the model 673 is part or all of the VHDL output 565. Block 665 is described in more detail in FIG. 8. Thus, in an exemplary embodiment, the modules 175 are compiled to VHDL, and the interface function calls in the modules are compiled to VHDL ports. Meanwhile, the pipeline 240 is only for simulation, so this is not compiled to VHDL.

In block 675, the microarchitecture design environment 135 performs low-level simulations of the circuitry. The microarchitecture design, environment 135 produces low-level simulation output 680. In the example of FIG. 2, the logic/physical synthesis block 570 performs block 675 and produces area and timing (and also power) results 575 as output 680. As with the high-level simulations, a designer can cause the microarchitecture design environment 135 to perform low-level simulations again (or both high- and low-level simulations), e.g., in response to the designer changing circuitry in a module 175.

Referring to FIG. 6, this figure is example of a drawn pipeline block diagram 710 in a GUI 186, in accordance with an exemplary embodiment. Specifically, this is an example of blocks 605 and 610 of FIG. 4. The GUT 186 is determined using the GUI programming 165 (see FIG. 1). Each box in the pipeline block diagram 710 is a pipeline stage with attributes, such as type, number of instructions, policy. In this example the PipeStage 720, which has an attribute "CMPL: PipeStageBuffer", is highlighted. Window 730 may be used by a designer to view or change the attributes of this PipeStage. The target object is CMPL and the example attributes 740 include the PipeStage SIZE attribute 740-1 with a value of 32 and the PipeStage_HOLD attribute 740-2 with a value of "true".

Turning to FIG. 7, this figure is an example of a specification of per-instruction variables in a configuration file, such as in block 610 of FIG. 4. Each ATTRIBUTE_INST includes a name and a type. These values during simulation will be moved along with instructions and read or updated via the pipeline interface model 150.

FIG. 8 is a logic flow diagram for synthesizing the interface to the pipeline, as indicated by block 665 in FIG. 5. FIG. 8 also illustrates the operation of an exemplary method, a result of execution of computer program instructions embodied on a computer readable memory, functions performed by logic implemented in hardware, and/or interconnected means for performing functions in accordance with an exemplary embodiment.

In block 910, the microarchitecture design environment 135 performs conflict analysis on interface function calls. This block may be performed by the SystemC-to-VHDL compiler 560 of FIG. 2 or during SystemC simulation. The conflict analysis is mainly necessary to enforce the fact that SystemC model 545 (e.g., C/C++ programming language with an extended library to allow hardware description, but its nature is still software specifically for interface functions) behaves the same as a VHDL model or hardware. That is, any disagreement between SystemC and VHDL models is considered as a conflict, and brought to the designer's attention (e.g., via a GUI on a display) as SystemC-to-VHDL synthesis errors so that the designer can correct the errors by removing the conflict from the design. In summary, there are two types of conflicts: set-set and set-get.

The set-set conflict is obvious because set functions update a state/variable, and calling more than one set function (i.e., a state being attempted to be updated by multiple processes at the same time) means a conflict. In this conflict case, VHDL simulation as well as real hardware produces an unknown value, whereas SystemC simulation chooses one of the set values non-deterministically. Therefore, checking for such case is important for design correctness. One note here is that more than one set within a process is okay because the last set value is always considered if the logic is described in a sequential manner in SystemC or VHDL.

The set-get conflict is caused by discrepancy between the two models. Possible scenarios are enumerated in the table below. Note that there is no conflict between get function calls because get functions read the value of a state only.

| Execution order by SystemC library | SystemC simulation | VHDL simulation | Conflict check |
|---|---|---|---|
| set after get (i.e., get -> set) within a process | get call returns the original value (i.e., the value before the set being done) | in port created from the get call sees the original value | not necessary |
| get after set (i.e., set -> get) within a process | get call returns the newly set value | in port created from the get call sees the original value | required |
| set after get (i.e., get -> set) by different processes | get call returns the original value | in port created from the get call sees the original value | not necessary |
| get after set (i.e., set -> get) by different processes | get call returns the newly set value | in port created from the get call sees the original value | required |

The interface function calls (IFCs) in SystemC model 545 become ports in VHDL (a "get" becomes an "in port" because the value of a state is read in; a "set" becomes an "out port" because the value of a state is written out). By definition, VHDL ports cannot see the value being updated, whereas SystemC functions may return the value being updated, depending on what order function calls are executed in by SystemC library.

Additionally, conflict detection may be performed by SystemC-to-VHDL compiler 560, and the AutoPipe 530 may generate a conflict list based on a pipeline definition (e.g., in the pipeline block diagram 155 and/or the configuration file 156). In one example, a pointer type is not allowed. The SystemC-to-VHDL compiler 560 may detect IFC conflicts based on the conflict list: use-def chain and loop analysis may be used for conflicts within a process. As is known, a use-definition (use-def) chain is a data structure that consists of a use, U, of a variable, and all the definitions, D, of that variable that can reach that use without any other intervening definitions. A definition can have many forms, but is generally taken to mean the assignment of some value to a variable (which is different from the use of the term that refers to the language construct involving a data type and allocating storage).

Alternatively, conflict detection can be done dynamically during SystemC simulation. This approach provides quicker feedback because the conflict is checked before Modules become synthesizable (i.e., generally much later stage of design). However, the detection is dependent on workload being simulated, and thus has limited coverage (i.e., all conflicts may not be detected if the workload does not exercise the case of certain conflicts). Workload is an application running on designed hardware. By running simulations with workloads, one can tell how great/bad the design would perform under such workloads or whether the design functions as intended (e.g., as described in design specification).

In block 920, the microarchitecture design environment 135 synthesizes interface function calls to ports in VHDL. This block may be performed by the SystemC-to-VHDL compiler 560 and by AutoPipe 530 of FIG. 2. More specifically, regarding interface function calls (MC) in Modules synthesized to VHDL ports, in an exemplary embodiment, the SystemC-to-VHDL compiler 560 looks for IFC (e.g., sc_port access) in a process. As described above, a return value becomes an in port or, if one of parameters is specified as an index, becomes an array of in ports. A parameter (e.g., referenced by value) can be an out port or, if one of parameters is specified as index, can be an array of out ports. Parameters may also be used as synthesis information: Part of port name, e.g., pl→getValid(IF)→pl_getValid_IF; Port array index, e.g., pl→getInstructionValid(IF, i)→pl_getInstructionsValid_IF[i].

In an exemplary embodiment, IFC ports are added and connected to parents in a hierarchy. IFC in methods, in an exemplary embodiment, need proper event functions to be added to a sensitivity list. A sensitivity list is the list of signals triggering an execution of SystemC methods. The list includes inputs of a logic implemented in methods. The change of input value propagates through the logic, so the change requires re-execution of methods by the SystemC kernel. In other words, no change in input value means no re-execution of methods needed because everything in the logic remains the same. FIG. 9 shows an example of an interface function call synthesized to a port.

In block 930, the microarchitecture design environment 135 performs VCD generation in the simulation flow. VCD generation for IFC ports may be performed as follows in an exemplary embodiment. First, create a SystemC trace object per IFC port. The port name and type may be the same as those in VHDL. This generates a value change trace of interface methods accessed in modules, which enables low-level simulation of applied workload. Next, update trace objects for set IFC ports based upon set IFC instructions. Also, update trace objects for get IFC ports based upon set and get IFC instructions, as well as based upon a parent object's set IFC instructions.

The microarchitecture design environment 135 in block 940 performs an equivalence check between SystemC model and the corresponding RTL model generated by SystemC-to-VHDL compiler by comparing SystemC simulations captured in VCD with RTL simulations.

Turning to FIG. 9, this figure shows an example of an interface function call synthesized to a port in accordance with an exemplary embodiment. Reference 1010 illustrates SystemC code, and reference 1020 within the SystemC code illustrates a pipeline interface call. This pipeline interface call 1020 is synthesized to the port (in VHDL in this example) 1030. Note that DEBUG and STATS are used during simulation but no VHDL is produced for these.

The following are possible exemplary embodiments.

Example 1

A method comprising: in a computing system running an environment for designing operation of circuitry, performing at least the following for providing simulations and evaluations of one or more user-defined modules of circuitry comprising one or more pipeline stages in a pipeline: automatically generating a model of the pipeline by using a pipeline block diagram, where the model is generated in a high-level modeling language able to perform simulations of circuitry with the pipeline; automatically generating an interface between the one or more user-defined modules and the generated model of the pipeline, the interface comprising a set of access methods to the pipeline; and performing evaluation of the one or more user-defined modules using the automatically generated model of the pipeline and the automatically generated interface.

Example 2

The method of Example 1, wherein the automatically generating a model and the automatically generating an interface are for a simulation flow supported by the environment, and wherein in response to a request to create synthesized versions of the one or more user-defined modules the environment performs a synthesis flow wherein: automatically generating an interface further comprises synthesizing the interface at least by converting the set of access methods to the pipeline to a set of ports in a hardware description language; and performing simulations further comprises performing simulations on the one or more user-defined modules with workloads using the automatically generated model of the pipeline and the automatically generated model of the interface to determine one or more design evaluation metrics of the one or more user-defined modules.

Example 3

The method of Example 2, wherein the one or more design evaluation metrics comprise one or both of at least one quality of hardware metric or at least one performance metric.

Example 4

The method of Example 2, wherein the automatically generating an interface comprises automatically generating two interface models, a first interface model to be used for the simulation flow and a second interface model to be used for the synthesis flow, and wherein the environment causes the computing system to select the first interface model in response to a user causing the environment to perform the simulation flow or to select the second interface model in response to the user causing the environment to perform the synthesis flow.

Example 5

The method of Example 2, wherein interface methods and parameter information is preserved in names and types of hardware ports converted from interface methods accessed in modules.

Example 6

The method of Example 2, wherein automatically generating an interface further comprises generating a value change trace of interface methods accessed in modules that enables low-level simulation of applied workload, and performing an equivalence check between high-level models with interface method access and low-level models with corresponding ports in the set of ports.

Example 7

The method of Example 2, wherein the set of access methods comprise a set of interface function calls and wherein synthesizing the interface further comprises performing conflict analysis on the interface function calls, wherein any disagreement between a high-level modeling language model for an interface function call and a hardware description language model for a corresponding port is considered a conflict.

Example 8

The method of Example 7, wherein the conflict analysis is conducted one or both of statically in the synthesis flow or dynamically in the simulation flow.

Example 9

The method of Example 8, wherein performing conflict analysis on the interface function calls is performed at least by detecting more than one update to a same state or one or multiple reads of a state being updated.

Example 10

The method of Example 8, further comprising bringing any conflicts to a designer's attention as errors so that the designer can correct the errors by removing the conflict from a design defining the circuitry, wherein if a dynamic approach is used, the errors are simulation errors, and if a static approach is used, the errors are synthesis errors.

Example 11

The method of Example 1, wherein the pipeline is completely defined by a certain number of user-defined modules, but the simulations are performed with less than the certain number of user-defined modules.

Example 12

The method of Example 1, wherein: automatically generating a model of the pipeline further comprises automatically generating the model of the pipeline as a channel using a container class in the high-level modeling language;

automatically generating an interface further comprises automatically generating the interface using an interface class in the high-level modeling language; and the high-level modeling language provides classes and a library which provide at least hardware description constructs.

Example 13

The method of Example 1, wherein: automatically generating a model of the pipeline further comprises generating the model by using inputs specifying the pipeline graphically or in text, pipe stage states, instruction-specific states, and information in templates comprising control and update mechanisms.

Example 14

The method of Example 1, wherein: performing evaluation further comprises storing all instructions in a table in a sorted manner based on their corresponding sequence numbers and having stages where instructions residing in the stages point to the table entries, and pre-computing any conditions dependent on topology of pipeline block diagrams and attributes.

Example 15

The method of Example 1, further comprising displaying results of performing the simulations and evaluations to a designer using one or more displays.

Another example is a computing system, comprising: one or more memories comprising computer-readable code; and one or more processors, which in response to execution of the computer readable code cause the computing system to perform any of the methods of Examples 1-15.

A further example is an apparatus comprising means for performing any of the methods of Examples 1-15. For instance, an apparatus could comprise: means for running an environment for designing operation of circuity, wherein the means for running the environment comprises means for performing at least the following for providing simulations and evaluations of one or more user-defined modules of circuitry comprising one or more pipeline stages in a pipeline, the means for performing comprising: means for automatically generating a model of the pipeline by using a pipeline block diagram, where the model is generated in a high-level modeling language able to perform simulations of circuitry with the pipeline; means for automatically generating an interface between the one or more user-defined modules and the generated model of the pipeline, the interface comprising a set of access methods to the pipeline; and means for performing evaluation of the one or more user-defined modules using the automatically generated model of the pipeline and the automatically generated interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the designer's computer, partly on the designer's computer, as a stand-alone software package, partly on the designer's computer and partly on a remote computer or entirely on the remote computer or server. In the latter scenario, the remote computer may be connected to the designer's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following abbreviations that may be found in the specification and/or the drawing figures are defined as follows:

BTAC branch target address cache
CPI cycles per instruction
GUI graphical user interface
IBM International Business Machines Corporation
IBUF instruction buffer
id or ID identification
IF instruction fetch
IFC interface function calls
IQ instruction queue
opcode operation code
PD physical design
RTL register-transfer level
UML unified modeling language
VCD value change dump
VHDL VHSIC hardware description language
VHSIC very high speed integrated circuit

What is claimed is:

1. A computing system, comprising:
one or more memories comprising computer-readable code; and
one or more processors, which in response to execution of the computer readable code cause the computing system to perform the following:
running an environment for designing operation of circuitry, wherein running the environment comprises performing at least the following for providing simulations and evaluations of one or more user-defined modules of circuitry comprising one or more pipeline stages in a pipeline:
automatically generating a model of the pipeline by using a pipeline block diagram, where the model is generated in a high-level modeling language able to perform simulations of circuitry with the pipeline;
automatically generating an interface between the one or more user-defined modules and the generated model of the pipeline, the interface comprising access to the pipeline, wherein the pipeline access allows the one or more user-defined modules to interact indirectly;
performing evaluation of the one or more user-defined modules using the automatically generated model of the pipeline and the automatically generated interface; and
directly connecting the user-defined modules to ports allowing the one or more user-defined modules to interact directly to replace the pipeline access between the one or more user-defined modules and the generated model of the pipeline.

2. The computing system of claim 1, wherein the automatically generating the model and the automatically generating the interface are for a simulation flow supported by the environment, and wherein in response to a request to create synthesized versions of the one or more user-defined modules the environment performs a synthesis flow wherein:
automatically generating an interface further comprises synthesizing the interface at least by converting the set of access methods to the pipeline to a set of ports in a hardware description language; and
performing simulations further comprises performing simulations on the one or more user-defined modules with workloads using the automatically generated model of the pipeline and the automatically generated model of the interface to determine one or more design evaluation metrics of the one or more user-defined modules.

3. The computing system of claim 2, wherein the one or more design evaluation metrics comprise one or both of at least one quality of hardware metric or at least one performance metric.

4. The computing system of claim 2, wherein the automatically generating an interface comprises automatically generating two interface models, a first interface model to be used for the simulation flow and a second interface model to be used for the synthesis flow, and wherein the environment causes the computing system to select the first interface model in response to a user causing the environment to perform the simulation flow or to select the second interface model in response to the user causing the environment to perform the synthesis flow.

5. The computing system of claim 2, wherein interface methods and parameter information is preserved in names and types of hardware ports converted from interface methods accessed in modules.

6. The computing system of claim 2, wherein automatically generating an interface further comprises generating a value change trace of interface methods accessed in modules that enables low-level simulation of applied workload, and performing an equivalence check between high-level models with interface method access and low-level models with corresponding ports in the set of ports.

7. The computing system of claim 2, wherein the set of access methods comprise a set of interface function calls and wherein synthesizing the interface further comprises performing conflict analysis on the interface function calls, wherein any disagreement between a high-level modeling language model for an interface function call and a hardware description language model for a corresponding port is considered a conflict.

8. The computing system of claim 7, wherein the conflict analysis is conducted one or both of statically in the synthesis flow or dynamically in the simulation flow.

9. The computing system of claim 8, wherein performing conflict analysis on the interface function calls is performed at least by detecting more than one update to a same state or one or multiple reads of a state being updated.

10. The computing system of claim 8, wherein the one or more processors, which in response to execution of the computer readable code further cause the computing system to perform the following: bringing any conflicts to a designer's attention as errors so that the designer can correct the errors by removing the conflict from a design defining the circuitry, wherein if a dynamic approach is used, the errors are simulation errors, and if a static approach is used, the errors are synthesis errors.

11. The computing system of claim 1, wherein the pipeline is completely defined by a certain number of user-defined modules, but the simulations are performed with less than the certain number of user-defined modules.

12. The computing system of claim 1, wherein:
automatically generating a model of the pipeline further comprises automatically generating the model of the pipeline as a channel using a container class in the high-level modeling language;
automatically generating an interface further comprises automatically generating the interface using an interface class in the high-level modeling language; and
the high-level modeling language provides classes and a library which provide at least hardware description constructs.

13. The computing system of claim 1, wherein:
automatically generating a model of the pipeline further comprises generating the model by using inputs specifying the pipeline graphically or in text, pipe stage states, instruction-specific states, and information in templates comprising control and update mechanisms.

14. The computing system of claim 1, wherein:
performing evaluation further comprises storing all instructions in a table in a sorted manner based on their corresponding sequence numbers and having stages where instructions residing in the stages point to the table entries, and pre-computing any conditions dependent on topology of pipeline block diagrams and attributes.

15. The computing system of claim 1, wherein the one or more processors, in response to execution of the computer readable code cause the computing system to perform the following: displaying results of performing the simulations and evaluations to a designer using one or more displays.

16. A computer program product comprising a computer readable storage medium comprising computer-readable code, the computer-readable code causing a computing system, in response to executing the computer-readable code, to perform the following:
running an environment for designing operation of circuitry, the running the environment comprising performing at least the following for providing simulations and evaluations of one or more user-defined modules of circuitry comprising one or more pipeline stages in a pipeline:
automatically generating a model of the pipeline by using a pipeline block diagram, where the model is generated in a high-level modeling language able to perform simulations of circuitry with the pipeline;
automatically generating an interface between the one or more user-defined modules and the generated model of the pipeline, the interface comprising access to the pipeline, wherein the pipeline access allows the one or more user-defined modules to interact indirectly;
performing evaluation of the one or more user-defined modules using the automatically generated model of the pipeline and the automatically generated interface; and
directly connecting the user-defined modules to ports allowing the one or more user-defined modules to interact directly to replace the pipeline access between the one or more user-defined modules and the generated model of the pipeline.

17. The computer program product of claim 16, wherein the automatically generating the model and the automatically generating the interface are for a simulation flow supported by the environment, and wherein in response to a request to create synthesized versions of the one or more user-defined modules the environment performs a synthesis flow wherein:
automatically generating an interface further comprises synthesizing the interface at least by converting the set of access methods to the pipeline to a set of ports in a hardware description language; and
performing simulations further comprises performing simulations on the one or more user-defined modules with workloads using the automatically generated model of the pipeline and the automatically generated model of the interface to determine one or more design evaluation metrics of the one or more user-defined modules.

18. The computer program product of claim 16, wherein the pipeline is completely defined by a certain number of user-defined modules, but the simulations are performed with less than the certain number of user-defined modules.

19. The computer program product of claim 16, wherein:
automatically generating a model of the pipeline further comprises automatically generating the model of the pipeline as a channel using a container class in the high-level modeling language;
automatically generating an interface further comprises automatically generating the interface using an interface class in the high-level modeling language; and
the high-level modeling language provides classes and a library which provide at least hardware description constructs.

20. The computer program product of claim 16, wherein:
automatically generating a model of the pipeline further comprises generating the model by using inputs specifying the pipeline graphically or in text, pipe stage states, instruction-specific states, and information in templates comprising control and update mechanisms.

\* \* \* \* \*